Patented Jan. 24, 1928.

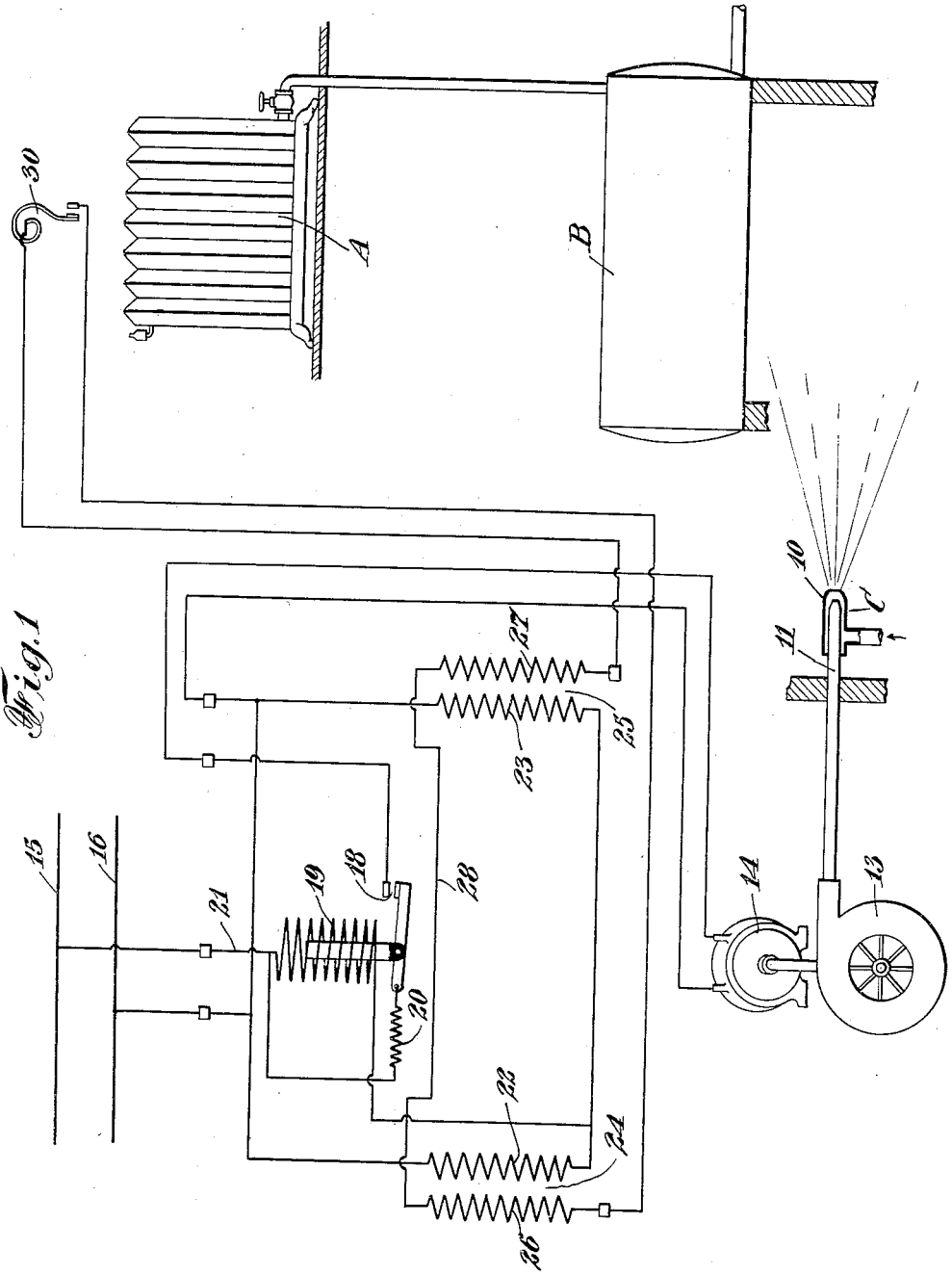

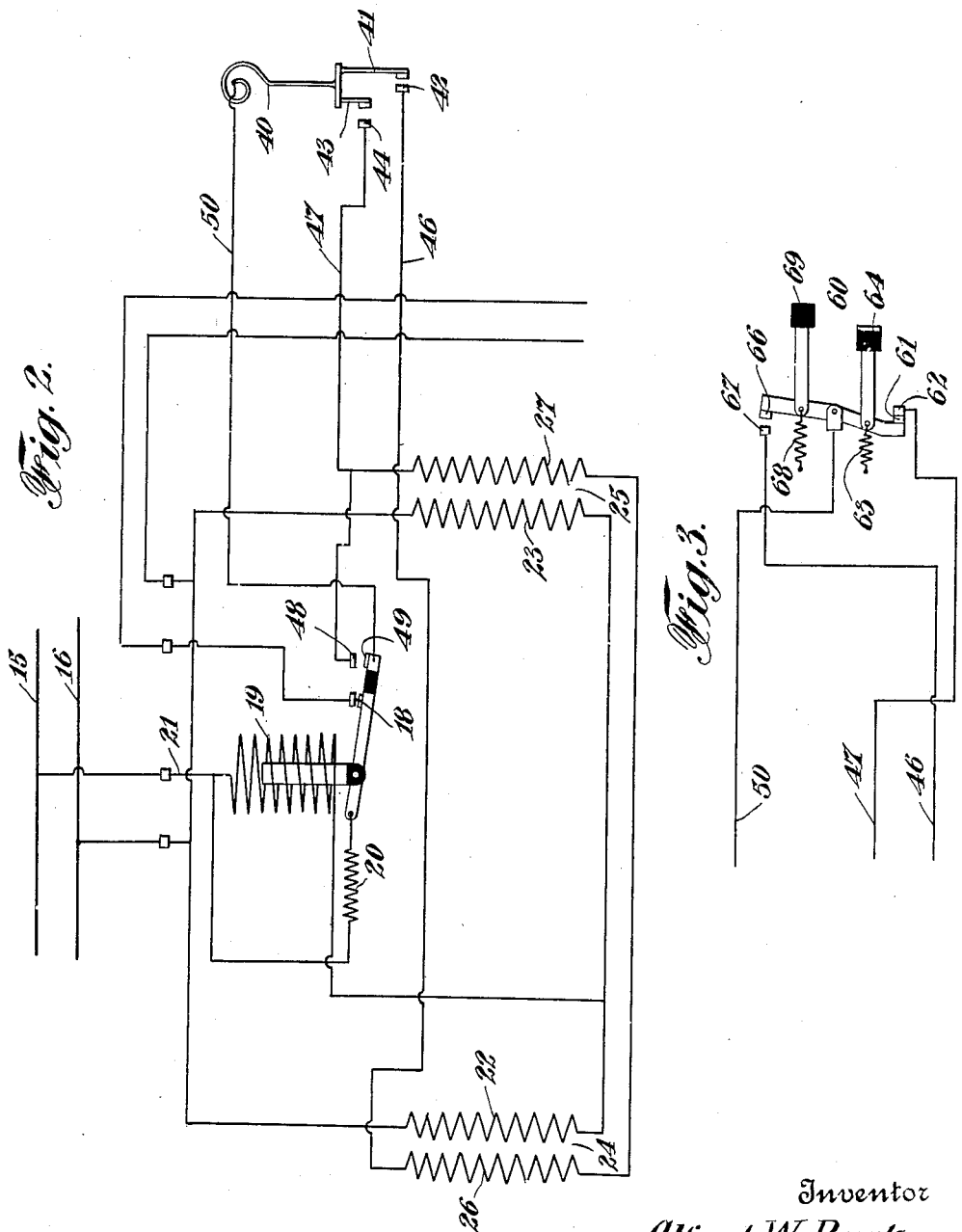

1,657,065

UNITED STATES PATENT OFFICE.

ALFRED W. BURKE, OF LONG ISLAND CITY, NEW YORK.

TEMPERATURE-CONTROLLING SYSTEM.

Application filed December 4, 1925. Serial No. 73,143.

This invention relates to temperature controlling systems, and particularly to those which employ electrical controlling circuits for the purpose of regulating the source of heat so as to regulate the generation of heat, and in this manner maintain the temperature in a room or other closure constant.

Numerous objects and advantages of my invention will appear from the following description taken in connection with the accompanying drawing, which illustrates a temperature control heating system constructed in accordance with my invention, and wherein Fig. 1 illustrates, diagrammatically, a thermostat control temperature regulating system constructed in accordance with one form of my invention. Fig. 2 shows a modification of the circuits for controlling the motor which operates the burner air nozzle, and Fig. 3 shows a modification of the control circuits wherein these circuits are adapted for manual control.

Referring to Fig. 1 of the drawing, "A" represents a radiator supplied with steam or hot water from a water compartment or boiler "B", adapted to be heated by a burner "C", which comprises an oil nozzle 10 and an air nozzle 11. The oil nozzle 10 is supplied with oil from a suitable tank not shown, and the air nozzle 11 is supplied with air from a suitable blower 13, operated by an electric motor 14. When the motor is operating the blower 13 causes a jet of air to issue from the nozzle 11, which causes oil to be drawn out of the nozzle 10 and atomized in the combustion chamber where it is burned beneath the boiler "B". The motor 14 is supplied with current from the constant voltage alternating current mains 15 and 16 through contacts 18, adapted to be operated by a contactor coil 19. The contacts 18, are closed when a current of predetermined value passes through the contactor coil 19, and are open when a current of less value passes through the contactor coil 19. A suitable blow-out coil 20 is connected in series with the contacts 18, and so positioned relative to these contacts, that when the contacts are separated to break the circuit to the motor, the magnetic field of the coil 20 serves to extinguish any arc which may be formed between these contacts.

One terminal of the contactor coil 19 is connected to the main 15 by means of a conductor 21 and the remaining terminal of the contactor coil is connected with the main 16 through the coils 22 and 23, which coils are arranged in parallel and form, respectively, the primary windings of transformers 24 and 25. One terminal of the secondary winding 26 of the transformer 24 is permanently connected with one terminal of the secondary winding 27 of the transformer 25 by a conductor 28, and the remaining terminals of the secondary windings 26 and 27 are adapted to be connected through a thermostat 30 located in the room or closure, the temperature in which is adapted to be controlled. When the thermostat 30 operates to close its contacts, which occurs when the room temperature drops below a desired minimum, a closed or short circuit is formed through the secondaries 26 and 27.

In practice, let it be assumed that the room temperature is above the desired minimum, in which case the circuit through the transformer secondaries will be open at the thermostat contacts. Current will be supplied from the mains 15 and 16 to the contactor coil 19, through the transformer primaries 22 and 23. The transformers are so constructed that, when their secondaries are open, they offer a high impedance to the passage of current through the primaries. As a result, a large proportion of the supply voltage of the mains 15, 16 is absorbed by the transformer primaries and the remaining portion of the supply voltage, which is impressed on the contactor coil 19, is not enough to cause sufficient current to flow through this coil to close the contacts 18. The circuit through the motor 14, therefore, remains broken at the contacts 18, and motor 14 and blower 13 remain idle. Let it then be assumed that the temperature in the room falls below the desired minimum, the thermostat 30 will operate to close its contacts and establish a circuit through the secondaries of the transformer. The current, which then flows through the secondaries, produces in the transformers 24 and 25 a flux which opposes the reactive flux of the primary, with the result that the reactance which opposes the passage of current through the primaries, is much reduced. This permits the contactor coil 19 to take a much greater proportion of the voltage of the supply mains 15 and 16, with the result that the current in the contactor coil is sufficient to cause this coil to close the contacts 18. The current then flows to the motor 14, and the motor operating the blower 13 causes the air jet to feed fuel to the combustion chamber to heat the boiler "B".

An advantage of having the control circuit through the thermostat supplied from the secondary of the transformer, is that the voltage of this circuit may be low as compared with the voltage of the supply mains 15 and 16. Low voltage wires may, therefore, be employed to connect the thermostat with the transformer secondary, and as the thermostat is often located at a considerable distance from the transformer, the use of low voltage conductors instead of high voltage conductors effects a considerable saving in the cost of installation. Furthermore, by employing a low voltage circuit arcing at the thermostat contacts is minimized.

To avoid any chattering at the contacts of the thermostat 30, this thermostat is preferably of the quick make and break type. Such a chattering may also be avoided by the use of a thermostat having two movable contacts such as the thermostat 40 shown in Fig. 2. In this figure the movable member of the thermostat 40 carries a long contact 41 adapted to engage a fixed contact 42, and also carries a short contact 43 adapted to engage a fixed contact 44. These contacts are so arranged that upon decrease in temperature contacts 41 and 42 are first brought into engagement and, subsequently, contacts 43 and 44 are brought into engagement. Contact 42 is connected by means of a conductor 46 to one terminal of the transformer secondary, while contact 44 is connected by conductor 47 to the other terminal of the transformer secondary and also to a fixed contact 48 adapted to be engagd by a movable contact 49 carried by a movable element of the contactor. Contact 49 is connected to the movable member of the thermostat by means of conductor 50. In other respects the circuits shown in Fig. 2 are the same as shown in Fig. 1. In operation of the form of my invention shown in Fig. 2, upon decrease in temperature, contact 41 of the thermostat moves into engagement with contact 42. This, however, does not close the circuit through the transformer secondary because the circuit through this secondary is broken at the contacts 48, 49 and also at the contacts 43 and 44. Upon continued decrease in temperature, however, contact 43 of the thermostat 40 moves into engagement with contact 44. This completes a circuit through the transformer secondary which may be traced from contact 41, contact 42, conductor 46, transformer secondary, conductor 47, contacts 44 and 43 back through the movable element of the thermostat to contact 41. Upon closing the secondary circuit in this manner sufficient current will flow through the contactor coil 19 to cause it to move contacts 18 into engagement and in this way close the circuit through the motor 14 in the same manner as has been described in connection with Fig. 1. At the same time, that contacts 18 are closed, contacts 48 and 49 are moved into engagement and in this manner the circuit which bridges the contacts 43 and 44 is completed. As the temperature of the room or compartment rises in response to the increased supply of heat from the burner "C", contact 43 will move away from contact 44, contacts 41 and 42, however, remaining in engagement for the time being. The separation of contacts 43 and 44 will not break the circuit through the transformer secondary because this circuit is still completed through contacts 48 and 49. When, however, the movable element of the thermostat 40 has moved sufficiently to break engagement of contacts 41 and 42, the circuit through the transformer secondary will be broken and as a result the current in contactor coil 19 will be decreased sufficiently to permit contacts 18 to open and contacts 48 and 49 to break engagement, and as a result, the motor 14 will stop and the control apparatus will be restored to its original condition.

When it is desired to control the operation of the burner or other device manually, instead of automatically, this may be done by the push button device 60 shown in Fig. 3. This device comprises a movable contact 61 which is normally pressed into engagement with a fixed contact 62 by means of a spring 63, and which may be moved out of engagement with contact 62 by a push 64 and a movable contact 66, which is normally held out of engagement with a fixed contact 67 by means of a spring 68 but which may be pressed into engagement with contact 67 by push 69. Both movable contacts 61 and 66 are connected to conductor 50 which, as shown in Fig. 2, is connected to movable contact 49 actuated by the contactor coil 19. Fixed contact 62 is connected to the conductor 47 which, as shown in Fig. 2, is connected to the fixed contact 48 and also to one terminal of the transformer secondary. Fixed contact 67 is connected to conductor 46, which, as shown in Fig. 2, is connected to the other terminal of the transformer secondary. It will be readily seen that if it is desired to start the motor 14, this may be accomplished by operating the push 69 so as to complete a circuit through contacts 66 and 67. Closing of the contacts 66 and 67 will effect the operation of the contactor and close contacts 48 and 49. Upon release of the push 69, the motor will continue operating because the circuit through the secondary will remain closed through contacts 48 and 49. When, however, it is desired to stop the motor 14 this may be accomplished by operation of the push 64 which will break the circuit through the transformer secondary and cause the separation of contacts 48 and 49. Release of the push 64 will not start the motor because the circuit through the transformer secondary is now broken at contacts 48 and 49.

While I have disclosed my temperature regulating system as adapted to control a fuel burner, it is obvious that such system might be used to maintain a uniformly low temperature in a compartment cooled by refrigerating system. When applied to such a system, the contacts of the thermostat would be so disposed and the arrangement of the parts would be such that on rise of temperature, either the refrigerating machine would be started or a valve controlling the supply of cooling brine to the refrigerating compartment would be open, and upon drop in temperature below predetermined point, the refrigerating machine would be stopped or the supply of the brine cut off.

I claim:—

1. In a temperature regulating system, the combination of a heater having a source of fuel supply, of means for feeding fuel to said heater comprising an electric motor, and means for controlling a circuit to said motor comprising a reactive coil and temperature responsive means controlling the reactance of said coil.

2. In a temperature regulating system, the combination of a heater, an electric motor for controlling said heater, a transformer having primary and secondary windings, a temperature responsive means for making or breaking a circuit through said secondary winding and means responsive to the current in said primary winding for controlling said motor.

3. In a temperature regulating system, a heater, an electric motor for controlling said heater, a magnetic switch for controlling the circuit to said motor, said switch having an operating coil, a source of current supply, a transformer the primary of which is connected in series with said operating coil to said source of supply, a heat responsive device and a circuit including secondary windings to said transformer adapted to be made and broken by said heat responsive device.

4. In a temperature controlling system, a heater, an electric motor for controlling said heater, a source of current supply, an electro magnetic switch for connecting said motor with said source of supply, said switch having an operating coil, two transformers having primary and secondary windings, means connecting said primary windings and operating coil across said source of supply with said operating coil in series with said primary windings, and said primary windings in parallel with each other, a thermostat and means operated by said thermostat for short circuiting the secondary windings of said transformer.

5. In a temperature regulating system, the combination of a heater, an electric motor for controlling said heater, a transformer having primary and secondary windings, means for making and breaking a circuit through said secondary windings and means responsive to current in said primary winding for controlling said motor.

6. In a motor controlling system, a motor controller, a transformer having a high voltage primary and a low voltage secondary winding, means for making and breaking a circuit through said secondary winding and means responsive to the current in said primary for operating said controller.

7. In a motor controlling system, a transformer having a high voltage primary winding and a low voltage secondary winding, a control device in circuit with said primary winding, a motor connected in parallel across said primary winding and said control device, and means for controlling said motor by making and breaking the circuit through the secondary winding.

ALFRED W. BURKE.